United States Patent

Vollmer

[15] 3,656,063

[45] Apr. 11, 1972

[54] DIGITAL FREQUENCY COMPARATOR

[72] Inventor: Donald W. Vollmer, Livermore, Calif.

[73] Assignee: The United States of America as represented by the United States Atomic Energy Commission

[22] Filed: Apr. 29, 1970

[21] Appl. No.: 32,948

[52] U.S. Cl. ....................328/133, 307/233

[51] Int. Cl. ....................H03d 13/00

[58] Field of Search ....................328/133, 48, 134, 141; 307/233

[56] References Cited

UNITED STATES PATENTS

| | | | |
|---|---|---|---|
| 3,382,376 | 5/1968 | Sowden | 328/133 |
| 3,395,352 | 7/1968 | McCammon | 328/48 |
| 3,013,211 | 12/1961 | Garabedian | 328/133 |
| 3,354,398 | 11/1967 | Broadhead | 307/233 |
| 3,514,705 | 5/1970 | Feigleson | 307/233 |
| 3,534,261 | 10/1970 | Haner | 328/133 |

*Primary Examiner*—Donald D. Forrer
*Assistant Examiner*—Ro E. Hart
*Attorney*—Roland A. Anderson

[57] ABSTRACT

A digital frequency comparator circuit whose output is the frequency difference between two input signals and which consists of two flip-flops triggered by the negative going portion of the input waveform connected in a divide-by-four configuration and where the reset output is energized whenever coincident input signals arrive at the first flip-flop's toggle and reset inputs. The circuit produces an output pulse whenever two consecutive negative going portions of an input waveform arrive at the toggle input without an intervening negative going portion of a second input waveform arriving at the reset input of the first flip-flop.

2 Claims, 2 Drawing Figures

INVENTOR.
Donald W. Vollmer
BY
Roland A. Anderson
ATTORNEY.

DIGITAL FREQUENCY COMPARATOR

BACKGROUND OF THE INVENTION

The invention described herein was made in the course of, or under, Contract No. W-7405-Eng-48 with the United States Atomic Energy Commission.

1. Field of the Invention

This invention relates to frequency comparators utilizing flip-flop components.

2. Prior Art

A frequency comparator is a circuit whose output frequency is equal to the frequency difference ($f_A$–$f_B$) between two input signals A and B. Conventional comparators operate on the heterodyning principle in which frequencies $f_A$ and $f_B$ are mixed in a non-linear device (such as a diode) to generate the difference frequency ($f_A$–$f_B$). One problem inherent in heterodyne type comparators is that the output contains frequencies other than the desired difference frequency ($f_A$–$f_B$). These other frequencies, generally the sum frequency ($f_A$+$f_B$) and harmonics of the input frequencies, must be carefully filtered from the output to obtain the desired difference frequency.

Frequency comparators utilizing digital signal components are types wherein two different frequency inputs, usually pulse trains, are fed into up-down counters where AND gates, OR gates, and flip-flops are interconnected to count up with one frequency pulses and count the same counter down with the other frequency pulses. Another common method is to allow each of the frequency pulses to add pulses in separate multistage adders and then compare each stage with its complementary stage in the other adder.

SUMMARY OF THE INVENTION

The present invention comprises digital circuitry which directly generates the difference frequency between the two input frequencies. More specifically, the invention consists of two flip-flops connected in a divide-by-four configuration. One frequency signal input connects to the toggle input of the first flip-flop and the second frequency signal input is connected to the reset input of both the first and second flip-flop. The flip-flops trigger on the negative going portion of the input waveforms and in the case of coincident inputs, the reset input always takes precedent. The output, a signal whose frequency is the difference of the two input signal frequencies, is sensed on the toggle output of the second flip-flop.

Accordingly, it is an object of the present invention to provide a method of obtaining the frequency difference between two input signals.

Another object of the present invention is to find the difference in number between two trains of pulses.

A further object of this invention is to provide a frequency comparator with a minimum amount of components.

DESCRIPTION OF THE INVENTION

Figure 1:
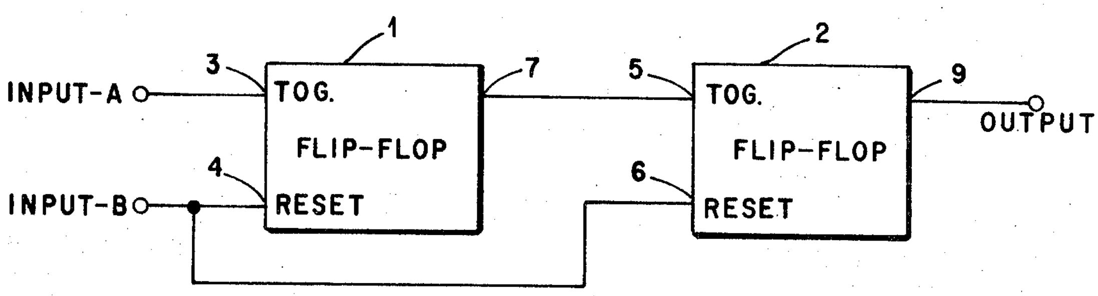
FIG. 1 is the logic diagram of the present invention.

As shown in FIG. 1, the embodiment of this invention which permits the subtraction of one signal frequency from another is the particular illustrated interconnection between the two flip-flops and the triggering property of the flip-flops. Signal input A is connected to the toggle input 3 of the first flip-flop 1 and signal input B is connected to the reset input 4 of flip-flop 1 and also the reset input 6 of the second flip-flop 2. Toggle output 7 of flip-flop 1 connects to the toggle input 5 of flip-flop 2. The output, which is indicative of the frequency difference ($f_A$–$f_B$) is taken from toggle output 9 of flip-flop 2. Flip-flops 1 and 2 toggle and reset trigger only on the negative going portion of the input waveforms. Triggering the toggle input will cause the flip-flop to flip, i.e., change states, irrespective of the prior state. In the event of coincidence of negative going portions of both inputs A and B, the flip-flops respond with a reset output, regardless of their prior state. An input triggering waveform to the reset input causes reset output and if the flip-flop's previous state was that of a reset output, the flip-flop remains in the same state.

Figure 2:
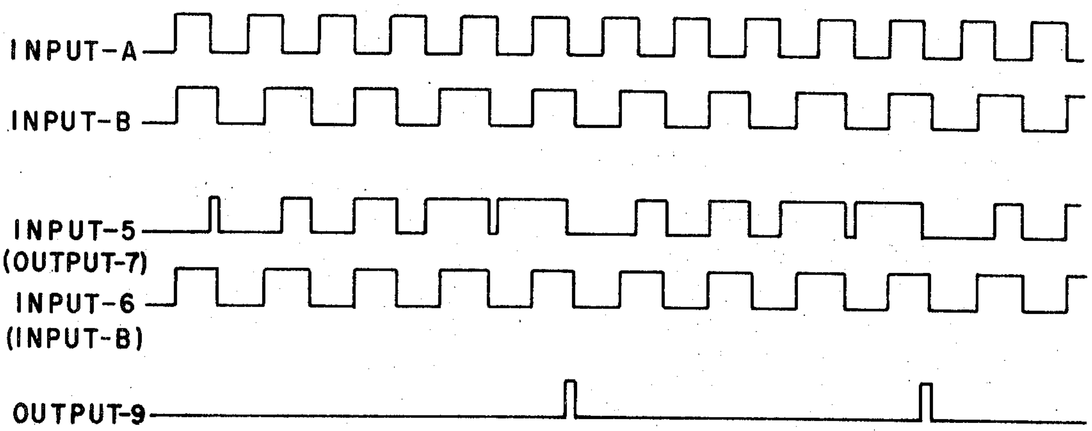
FIG. 2 illustrates the various electrical waveforms with their time relationship that will be found within the logic diagram.

FIG. 2 shows the time relationship of the electrical waveforms at various points in the logic schematic of the frequency comparator. Input A and input B are two trains of pulses having different repetition rates, effectively frequencies. Output 7, the toggle output of flip-flop 1, is present during the interval of time between the trailing edge of input A pulse and the trailing edge of reset input B pulse. Input 5, directly wired from output 7, is matched with input B at flip-flop 2. Again, the output of flip-flop 2 occurs only between the trailing edge of input 5 and the trailing edge of reset input B. The result is a pulse train whose repetition rate, or frequency, is the difference between $f_A$ and $f_B$. Simply stated, the circuit produces an output pulse at toggle output 9 whenever two consecutive pulse trailing edges arrive at the toggle input without an intervening pulse trailing edge at the reset input. Thus, the condition exists that input frequency $f_A$ must always be greater than frequency $f_B$ and that $f_A$ must be connected to the toggle input of the flip-flop in order to make the frequency comparator operative.

The flip-flops utilized in this invention are commercially available type Signetics N 8281 A—Binary Counter with inputs frequency $f_A$ connected to CLOCK 2, frequency $f_B$ capacitor coupled to CLEAR and comparator frequency output on C.

Although the foregoing embodiment has been described in detail, there are obviously many other embodiments and variations in configuration which can be made by a person skilled in the art without departing from the spirit, scope, or principle of this invention. Therefore, this invention is not to be limited except in accordance with the scope of the appended claims.

What is claimed is:

1. A frequency comparator comprising: (a) a first flip-flop having at least a toggle input an output responsive to the toggle input, and a reset input; said first flip-flop toggle input electrically connected to a first electric signal source of one frequency and said reset input electrically connected to a second electric signal source of a second frequency; and (b) a second flip-flop having at least a toggle input, an output responsive to the toggle input and a reset input; said second flip-flop toggle input electrically connected to the toggle output of the first flip-flop and said reset input electrically connected to said second electric signal source of said second frequency; and (c) said first and second flip-flops include means for triggering said toggle and reset inputs on the negative going portion of said first and second electric signal sources, and thereby providing an output whose frequency is indicative of the one signal frequency less the second signal frequency.

2. The frequency comparator as defined in claim 1 wherein said first and second flip-flops reset input associated responsive reset output is energized whenever negative going portions of the associated electric signal waveforms appear simultaneously at the toggle and reset inputs.

* * * * *